Figure 1:
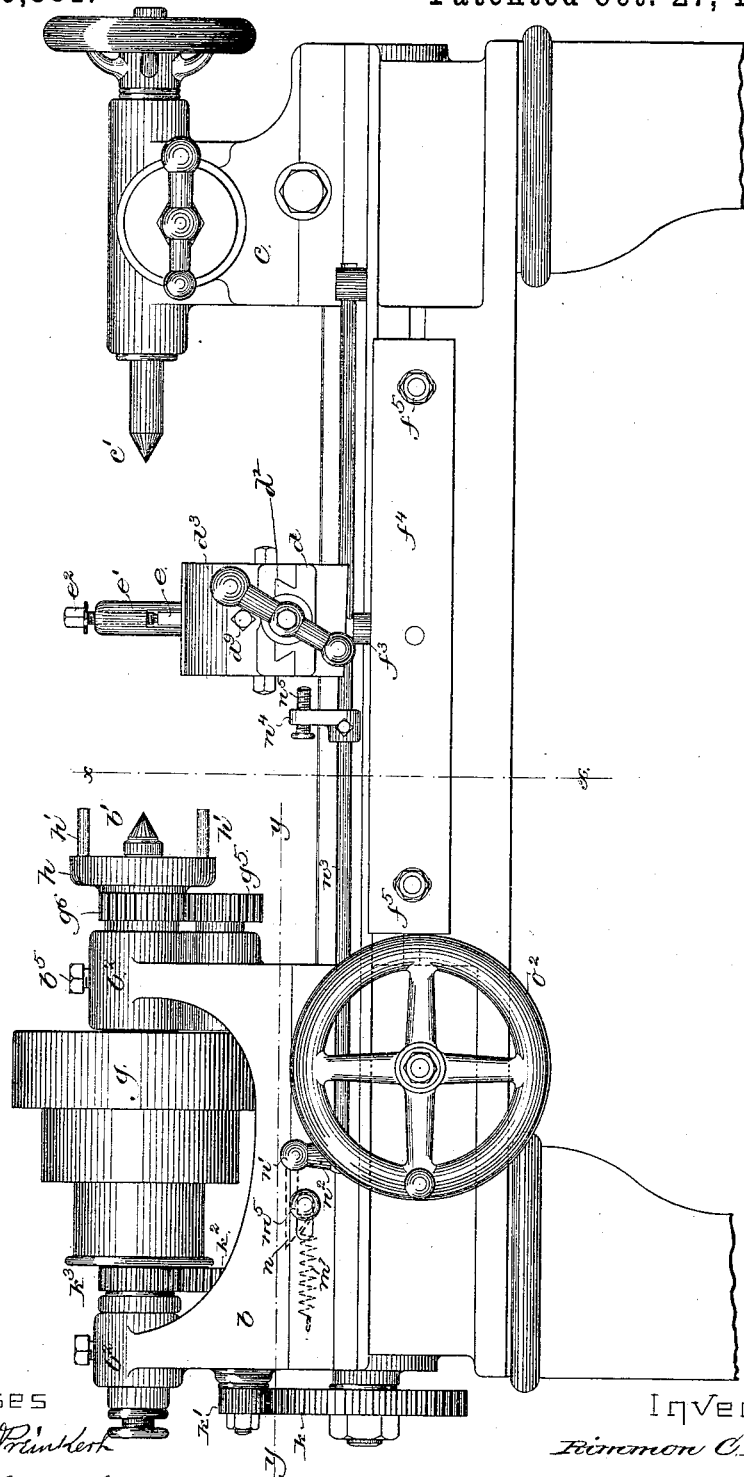

(No Model.)

4 Sheets—Sheet 1.

R. C. FAY.
LATHE.

No. 329,381. Patented Oct. 27, 1885.

Witnesses
John F. C. Prinkert
B. J. Noyes.

Inventor
Rinemon C. Fay.
by Crosby & Gregory attys.

(No Model.) 4 Sheets—Sheet 2.

R. C. FAY.
LATHE.

No. 329,381. Patented Oct. 27, 1885.

Witnesses
Inventor
Rimmon C. Fay
By Crosby & Gregory Attys.

(No Model.) 4 Sheets—Sheet 3.
R. C. FAY.
LATHE.
No. 329,381. Patented Oct. 27, 1885.
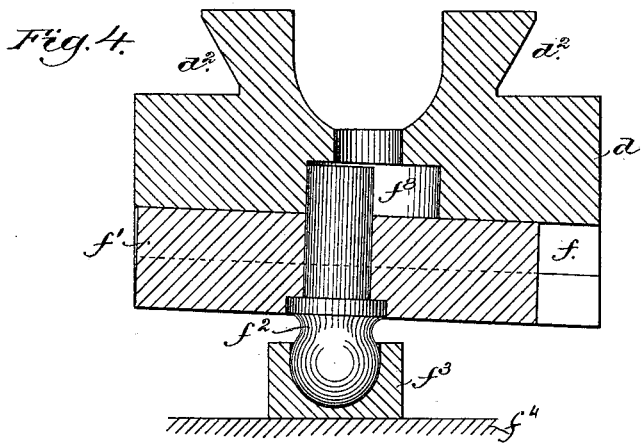
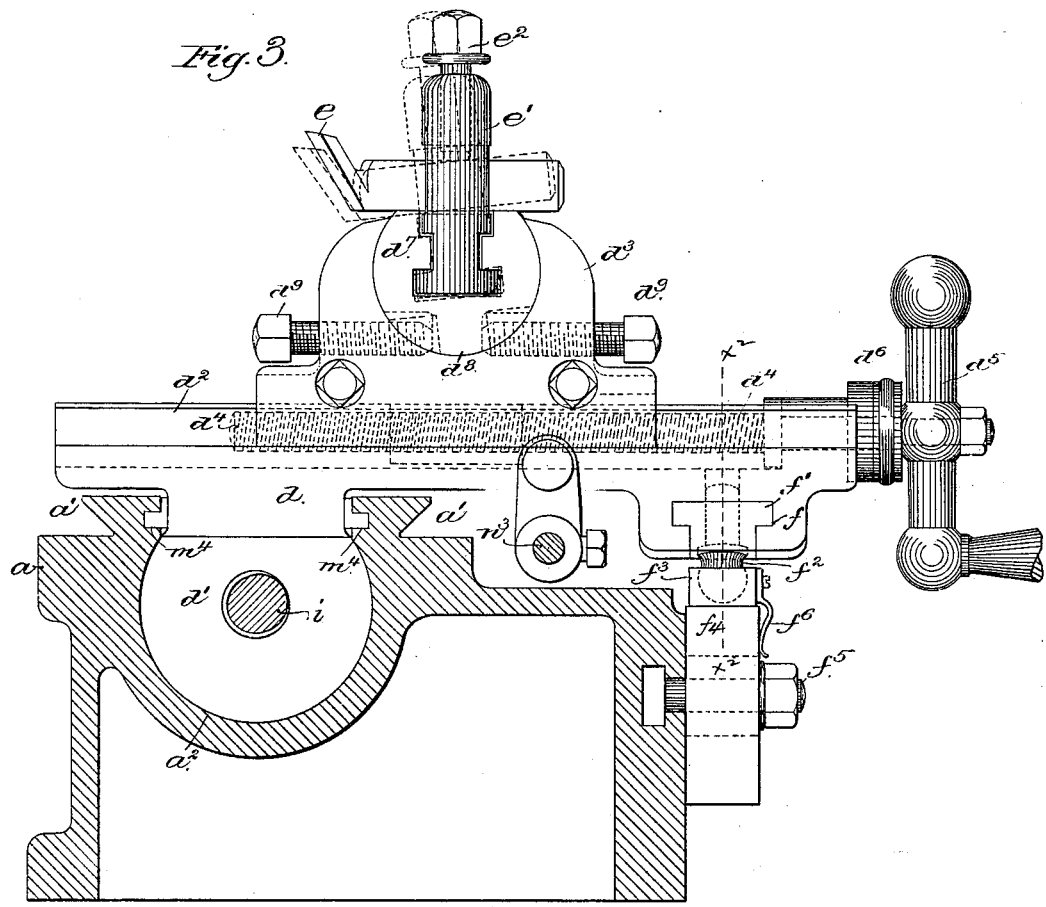
Witnesses
John F. C. Prindle
B. J. Noyes
Inventor
Rimmon C. Fay
by Crosby Gregory Attys

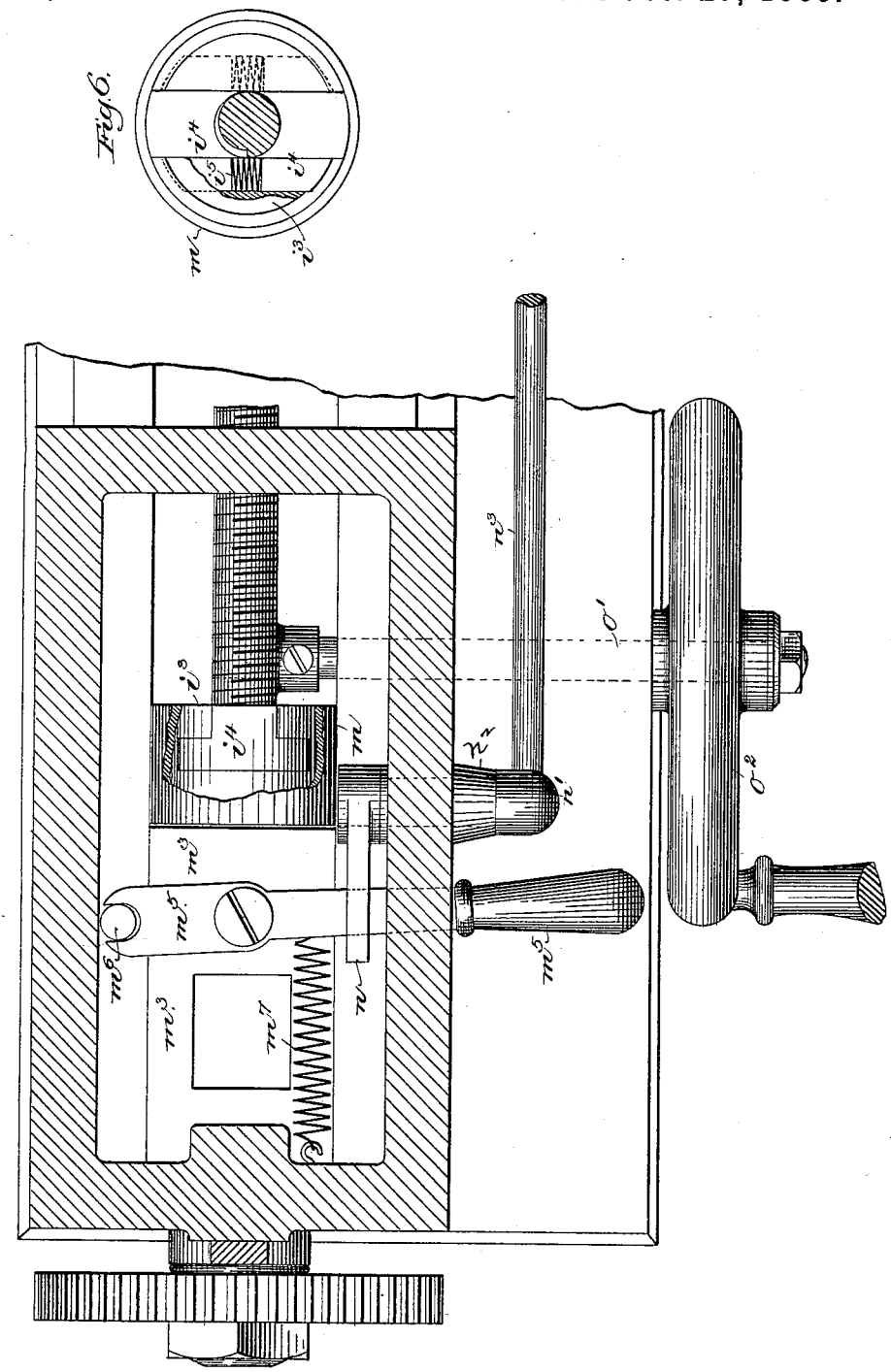

UNITED STATES PATENT OFFICE.

RIMMON C. FAY, OF HOPEDALE, MASSACHUSETTS.

LATHE.

SPECIFICATION forming part of Letters Patent No. 329,381, dated October 27, 1885.

Application filed November 30, 1883. Serial No. 113,215. (No model.)

*To all whom it may concern:*

Be it known that I, RIMMON C. FAY, of Hopedale, county of Worcester, State of Massachusetts, have invented an Improvement in Lathes, of which the following description, in connection with the accompanying drawings, is a specification, like letters on the drawings representing like parts.

My invention is embodied in a lathe specially intended for turning objects of circular cross-section having their longitudinal section shaped in accordance with a pattern or templet, shown in this instance as arranged to produce a uniform taper in the article being turned.

The invention consists in various details of construction having for their object to enable the lathe to be more conveniently and rapidly operated than those in general use, it being arranged so that the article to be turned may be applied without stopping the rotation of the actuating-pulley, the feed of the cutting-tool being automatically stopped at the proper point. The head-stock is so constructed that its center and spindle may be caused to rotate with the actuating-pulley, or may be stationary like the tail-stock center, the face-plate being rotated around it, so as to cause the work to be turned to rotate upon stationary centers at both ends, the lathe thus being convertible from what is called a "live-spindle" to a "dead-spindle" lathe. The tool-carriage in addition to its longitudinal movement on the lathe-bed also has an oscillatory or pivotal movement thereon, by which the cutting point or edge of the tool is caused to approach and recede from the axis passing through the lathe-centers, to thus produce the desired shape in the article being turned; and means are provided whereby in retracting the tool after the article has been turned its cutting point or edge is withdrawn slightly from the article, so as not to scratch the surface thereof. The lathe-bed has a cylindrical trough-like guide below the usual ways, and the head and tail stocks are clamped or fastened upon the said ways, while the tool-carriage has a long cylindrical foot, which travels in the tubular guide-passage of the bed, the ends of the said foot being capable of passing beneath the head and tail stocks, so that the tool may have the entire range of movement between the lathe-centers, while its carriage has a very long guiding-surface, enabling it to be guided without lost motion, and reducing the wear to a minimum.

Figure 2:
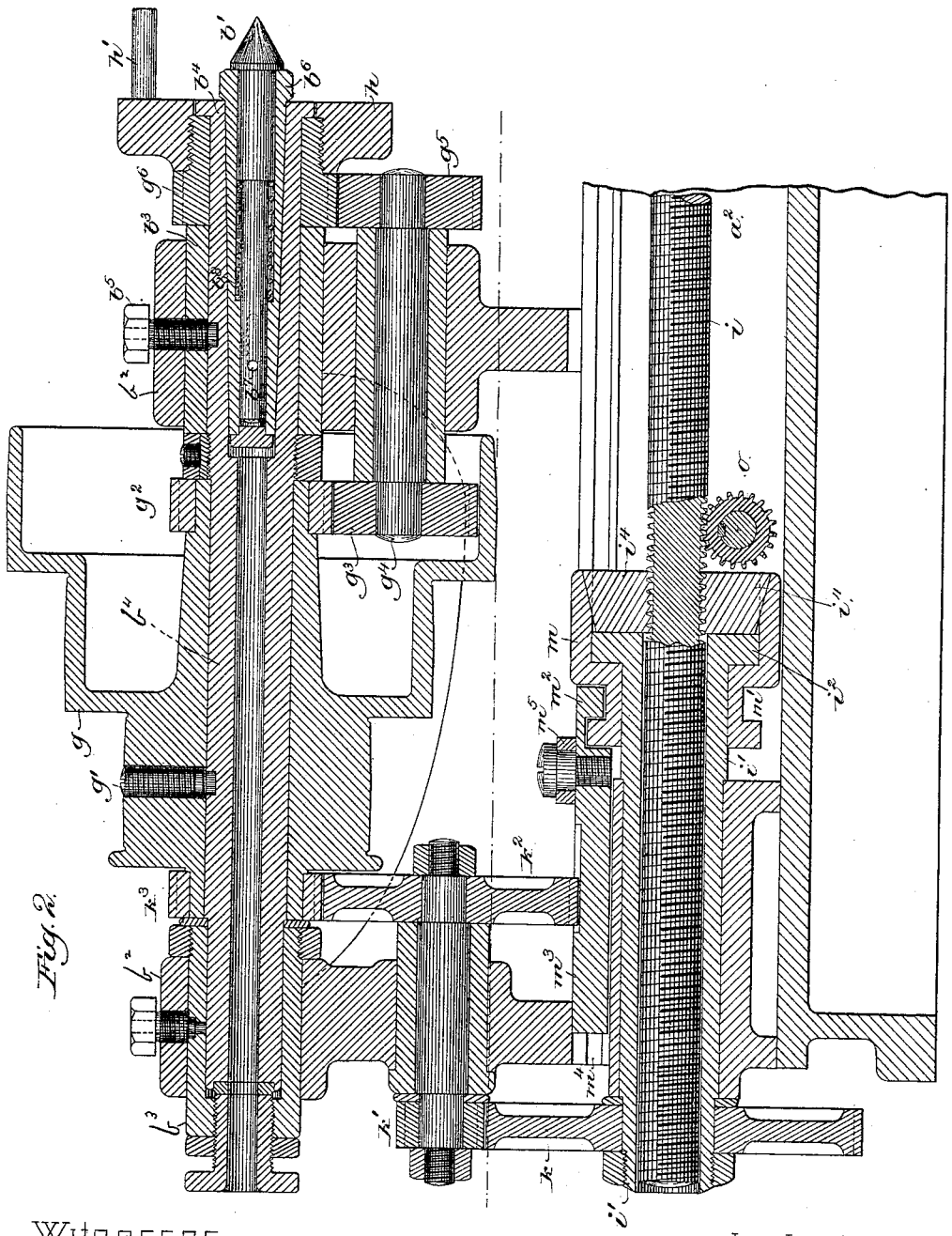

Figure 1 is a front elevation of a lathe embodying this invention; Fig. 2, a longitudinal section thereof through the head-stock and bed on a larger scale; Fig. 3, a transverse vertical section on line $x\ x$, Fig. 1; Fig. 4, a sectional detail on line $x^2\ x^2$, Fig. 3, of the portion of the tool-carriage engaged by the templet; Fig. 5, a horizontal section on line $y\ y$, Fig. 1, and Fig. 6 a detail of a portion of the carriage feeding mechanism.

The lathe-bed $a$, provided with dovetail ways $a'$, upon which the head and tail stocks $b$ and $c$ are clamped in any suitable or usual manner, is provided with a cylindrical trough-shaped guide, $a^2$, the axis of which is preferably in the same vertical plane with the axis or line joining the points of the centers $b'\ c'$ of the head and tail stocks. The center $c'$ of the tail-stock may be moved longitudinally in the said stock and clamped in any suitable or usual way. The tool-carriage $d$ has a long cylindrical foot, $d'$, accurately fitted into the guide $a^2$ of the lathe-bed, so that it may slide longitudinally thereon, and also oscillate sufficient to enable the tool $e$, carried by it at or near the level of the centers $b'\ c'$, to be moved laterally toward and from the axis of the said centers. The foot $d'$ is wholly below the head and tail stocks, and may consequently project beneath them, thus permitting the tool $e$ to move the entire distance between the centers, although the said foot is made very long, so as to afford a sufficient bearing to prevent any twisting of the tool-carriage, and insuring a large wearing-surface, so that the lathe may be used for a very long time without wear between the surfaces of the foot $d'$ and guide $a^2$. The carriage $d$ is provided with a dovetail guide, $d^2$, for a slide, $d^3$, operated by a screw, $d^4$, having a handle, $d^5$, and preferably provided with a micrometer-gage, $d^6$. The slide $d^3$ has a transverse cylindrical passage containing a cylindrical block, $d^7$, having recesses to receive the ends of set-screws $d^9$, which engage the portion $d^8$ of the block between them, enabling the said block to be rocked in order to vary the position of the point of the tool $e$, held in the tool-post $e'$, the lower end of which has a T-shaped head engaging a corresponding groove in the block $d^7$. A set-screw, $e^2$, clamps the tool-post and block $d^7$ tightly, and the full and dotted line positions in Fig. 3 indicate the adjustments of the tool by means of the set-screws $d^9$. The portion of the tool-carriage $d$ extending out at the front of the lathe is provided at its under side with a T-shaped groove, $f$, containing a block, $f'$, provided with a stud, $f^2$, shown in this instance as having a shoe, $f^3$, which rests upon the templet $f^4$, by means of which the carriage is rocked and the point of the tool caused to receive the lateral movement for shaping the article being turned. The templet $f^4$ consists in this instance of a bar pivoted near its middle upon the lathe-bed and having its ends secured, when its upper surface is at the proper inclination, by set-screws $f^5$, the surface of the said templet preferably being at the same distance as the point of the tool $e$ from the axis of rotation of the tool-carriage, so that a given inclination of the said templet from the position of parallelism with the axis of the tool-carriage will produce a corresponding inclination or slant in the side of the article being turned. The guide-groove $f$ for the block $f'$ is inclined, as best shown in Fig. 4, and the friction between the stud $f^2$ or shoe $f^3$ and templet is greater than that between the block $f'$ and carriage $d$, so that when the carriage is fed forward from the tail-stock toward the head-stock the carriage will first slide along the block $f'$ for a short distance, causing an inward movement of the point of the tool, which takes place before it reaches the piece to be turned, and at the end of such slight movement the carriage $d$ positively engages the stud $f^2$, causing it to travel along the templet, and thus control the position of the point of the tool with relation to the piece being cut. In the return movement of the tool or retraction of the tool-carriage the reverse operation takes place, the carriage $d$ first sliding in relation to the block $f'$, and thereby producing a slight retraction of the point of the tool from the work or turned article, after which the carriage slides back, controlled by the templet $f^4$, the tool thus passing parallel with the face of the article that has been turned and just clear of it, so as not to scratch the surface, the block $f'$ and stud $f^2$ constituting an automatic tool-controlling device. The shoe may be held with relation to the templet $f^4$ by a suitable friction device or spring, $f^6$, so that it will not move until the stud $f^2$ is positively engaged by the carriage $d$ at the ends of the slot $f^8$ in the said carriage.

The operation of the tool-controlling devices by which the tool is slightly withdrawn from the finished surface when the tool-carriage is retracted may be readily understood by referring to Figs. 3 and 4, the latter representing the parts in the position occupied just before the lathe begins to operate on a new piece of work. The feed-mechanism will then move the carriage $d$ from the right toward the left in Fig. 4, and the shoe $f^3$ and block $f'$ will remain stationary, owing to the friction between the said shoe and templet $f^4$. As the left-hand end of the block $f'$ is higher than the right-hand end, the portion of the carriage resting on the block—namely, the overhanging portion at the right of Fig. 3—will be raised in this movement of the carriage on the block, thus producing a slight oscillatory movement of the carriage, by which the point of the tool is swung inward around the axis of the guide $a^2$ toward the work, and by the time the carriage has traveled the length of the slot $f^8$ the point of the tool will be in the proper position to work, and the carriage will engage the shank of the stud $f^2$, so that the block $f'$ and shoe $f^3$ will accompany the carriage in its further movement, the ensuing operation being the same as if the carriage rested directly on the shoe $f^3$ or templet $f^4$. If other forms than a straight taper are to be made, the surface of the templet $f^4$ may be shaped to correspond with the side of the finished article, and the stud $f^2$ may bear directly on its surface, its bearing being reduced to a knife-edge, if necessary. The head-stock $b$ is provided with usual bearing-sockets, $b^2$, containing bushings $b^3$, in which the spindle $b^4$, containing the center $b'$, is free to turn when it is desired to have the said center rotate to constitute a live-spindle lathe, the spindle being then actuated by the actuating speed-pulley $g$, which is free to turn upon the said spindle $b^4$, but may be fixed thereon by a fastening device shown as a set-screw, $g'$, when it is desired to have the spindle rotate. When, however, it is desired to have the center $b'$ stationary, the spindle $b^4$ may be made fast by means of the set-screw or fastening device $b^5$, the set-screw $g'$ then being turned out, as shown in Fig. 2, leaving the actuating-pulley $g$ free to rotate on the said spindle as a bearing. In either case the work or article to be turned, provided with a suitable dog or equivalent, is caused to rotate upon the centers $b'$ and $c'$ by means of connecting mechanism between it and the actuating-pulley, consisting of a gear, $g^2$, fixed inside the actuating-pulley $g$ and meshing with an intermediate, $g^3$, on a spindle, $g^4$, turning in a bearing in the head-stock, and provided with a second intermediate, $g^5$, meshing with a gear, $g^6$, connected with the face-plate $h$, the said gear $g^6$ and face-plate turning freely upon the spindle $b^4$. The face-plate $h$ may be provided with the usual radial slots to receive the arm of a dog, but is herein shown as having engaging-pins $h'$, and the center $b'$, instead of being fixed tightly in a tapering socket in the spindle as usual, is free to move longitudinally in a sleeve, $b^6$, that is fixed after the manner of the usual centers, and is adapted to be driven out by a rod inserted through the tubular passage in the spindle. The longitudinal movement of the center $b'$ is limited by a pin, $b^7$, working in a slot, (shown in dotted lines in the sleeve or bushing $b^6$,) and the said center is acted upon by a spring, $b^8$, tending to throw it forward as far as permitted by the said pin $b^7$, this forward movement taking place when the tail center $c'$ is retracted, and being sufficient to disengage the dog from the face-plate, so that the turned piece may be removed without stopping the rotation of the spindle. A new piece will then be applied between the centers while the center $b'$ is in its forward position, and then as the center $c'$ is moved toward the center $b'$ the latter will recede and the dog be engaged by the face-plate, thus setting the piece to be turned in rotation without previously stopping the lathe.

The feed of the tool is produced by means of a screw, $i$, fixed in the foot $d'$ of the tool-carriage and passing through a hollow spindle, $i'$, beneath the head-stock of the lathe, the said spindle being rotated by gearing $k$ $k'$ $k^2$ $k^3$ from the actuating-pulley $g$. The spindle $i'$ is provided at its forward end with an enlargement or head, $i^2$, having transverse guides $i^3$, containing slide-blocks $i^4$, threaded to engage the feed-screw $i$, and together constituting a separable nut, the said blocks being acted upon by springs $i^5$, (see Fig. 6,) tending to separate them, so as to disengage them from the threads of the screw $i$. The said screw, nut, spindle, and gearing constitute the feed mechanism. The parts $i^4$ of the nut are moved to engage or disengage the screw $i$ by a sleeve, $m$, having inclines to engage the inclined ends of the blocks $i^4$, as seen in Fig. 2, thus forcing them together or permitting them to separate as the said sleeve $m$ is moved longitudinally on the spindle $i'$. The sleeve $m$ is provided with an annular groove, $m'$, engaged by a projection, $m^2$, of the plate $m^3$, sliding in guides $m^4$, between the dovetail guides $a'$ of the lathe-bed, the said plate $m^3$ being operated by a hand-lever, $m^5$, (see Fig. 5,) pivoted thereon, and engaging a stud or fulcrum, $m^6$, in the interior of the head-stock, these parts constituting the feed-starting mechanism of the lathe. A spring, $m^7$, tends to move the hand-lever $m$ in the direction to permit the separation of the blocks $i^4$, and the said lever is held in place to keep the block in engagement with the screw, while the tool is operating by means of a latch, $n$. This latch $n$ is on an arm of a rock-shaft, $n'$, extending through the side of the head-stock, and provided with an arm, $n^2$, connected with a rod, $n^3$, extending along the front of the lathe, and provided with an adjustable projection or tappet, $n^4$, having an adjustable stud, $n^5$, which is engaged by the tool-carriage $d$ in its feeding movement from the tail toward the head-center, thus releasing the latch $n$ from the arm $m^5$, and permitting the latter to move under the action of the spring $m^7$, so as to separate the nut and stop the feed, these parts constituting the automatic feed-stopping mechanism. The feed-screw $i$ is engaged by a pinion, $o$, (see Fig. 2,) on a shaft, $o'$, provided with a hand-wheel, $o^2$, by which the tool-carriage may be moved forward or backward when the nut is separated and disengaged from the said feed-screw.

The lathe herein shown and described is especially intended for turning short articles of small diameter, the maximum distance between the centers being about one foot, so that the movement of the feed-screw $i$ from the end of the lathe and bed will not be objectionable. The lathe is very convenient in operation, and also is of extreme accuracy, there being no lost motion between the operative parts, so that the tool travels in an absolutely defined path with relation to the article being turned.

In operation the tool-carriage is first retracted by the hand-wheel $o^2$. The center $c'$ is then retracted in the usual manner, and a blank or piece to be turned is placed on the centers $c'$ $b'$, the latter then projecting, so as to permit the piece to be thus applied without stopping the rotation of the face-plate $h$. The center $c'$ is then moved up, bringing the piece to be turned into engagement with the face-plate, and thereby causing it to be set in rotation. The handle $m^5$ is then moved up and engaged by the latch $n$, and the feed begins, the tool being first moved inward to operate on the work by the movement of the carriage $d$ relative to the block $f'$, as best understood by reference to Fig. 4, and then moving forward over the work in a path determined by the position or shape of the upper surface of the templet $f^4$. When the surface to be turned is finished, the carriage $d$ engages the stud $n^5$, releasing the handle $m^5$ and permitting the feed of the carriage to stop. The line of action of the feed is central, producing no tendency to twist the tool-carriage.

I claim—

1. In a lathe, the bed provided with ways for the head and tail stocks, and an independent guide for the tool-carriage combined with said stocks and carriage, a templet to oscillate said carriage, and means to move the latter longitudinally, substantially as described.

2. The bed having a cylindrical guide, $a^2$, combined with the tool-carriage having a foot fitted in said guide to permit oscillation and longitudinal movement of the carriage with respect to the bed, a templet co-operating with the carriage to oscillate it, and a feed-screw, and means to rotate it to move the carriage longitudinally, substantially as described.

3. In a lathe, the head-stock, its spindle, and the pulley $g$, adapted to be connected with and disconnected from the spindle, combined with gearing interposed between the head-stock and the pulley, whereby the work or piece to be turned is rotated independently of the spindle, substantially as described.

4. The head-stock and spindle having bearings therein, combined with the actuating-pulley capable of rotation upon the spindle, and fastening devices whereby the spindle may be held stationary or may be fastened to and rotated with the actuating-pulley, substantially as described.

5. In a lathe, the combination of the tool-carriage and its tool with the feed mechanism $k\ k'\ k^2\ k^3$ and $i\ i'\ i^4$ and tool-controlling device $f'\ f^2\ f^3$, substantially as described, and for the purpose specified.

6. The bed having a cylindrical guide, $a^2$, arranged below and clear of the head and tail stocks, and the head and tail stocks on the said bed, combined with the tool-carriage provided with a foot having a longitudinal and pivotal movement in the said guide, the said foot being capable of passing beneath the said head and tail stocks, substantially as and for the purpose described.

7. The lathe-bed and tool-carriage having a pivotal movement therein, combined with a templet controlling the said movement and the block interposed between the said carriage and templet, the said carriage having an inclined bearing on the said block and having a limited movement with relation thereto, substantially as and for the purpose described.

In testimony whereof I have signed my name to this specification in the presence of two subscribing witnesses.

RIMMON C. FAY.

Witnesses:
JOS. P. LIVERMORE,
W. H. SIGSTON.